United States Patent [19]

Sorg et al.

[11] Patent Number: 4,965,812

[45] Date of Patent: Oct. 23, 1990

[54] ELECTRODE FOR A GLASS MELTING

[75] Inventors: Helmut Sorg, Glattbach; Helmut Pieper; Rudolf Kessel, both of Lohr/Main, all of Fed. Rep. of Germany

[73] Assignee: Sorg GmbH & Co. KG, Lohr/Main, Fed. Rep. of Germany

[21] Appl. No.: 433,325

[22] Filed: Nov. 8, 1989

[30] Foreign Application Priority Data

Dec. 7, 1988 [EP] European Pat. Off. ........... 88120402

[51] Int. Cl.[5] ........ C03B 5/027

[52] U.S. Cl. ........ 373/36

[58] Field of Search ........ 373/36, 37, 38, 29, 373/30, 93

[56] References Cited

U.S. PATENT DOCUMENTS

| | | | |
|---|---|---|---|
| 4,159,392 | 6/1979 | Fineo et al. | 373/38 |
| 4,351,054 | 9/1982 | Olds | 373/38 |
| 4,429,402 | 1/1984 | Carley | 373/37 |
| 4,862,477 | 8/1989 | Olds et al. | 373/36 |

*Primary Examiner*—Roy N. Envall, Jr.

*Attorney, Agent, or Firm*—Felfe & Lynch

[57] ABSTRACT

Electrode for a glass melting furnace which avoids the disadvantages of known electrodes which are either expensive and difficult to manufacture, or have operational disadvantages, especially in regard to the delivery of electric power into the molten glass and/or in regard to trouble-free useful life. The new electrode is less costly to make and has better operational properties. The electrode shaft 2 is a coaxial tube 20 with an inner tube 21 of a metal constituting a good electrical conductor, preferably copper, and with the outer tube 22 of a mechanically strong, heat-resistant metal, preferably steel. Moreover, the electrode body 3 can be made thicker in areas of intense corrosion. The new electrode is suitable for all glass melting furnaces which are partially or entirely heated with electricity.

11 Claims, 4 Drawing Sheets

ELECTRODE FOR A GLASS MELTING

BACKGROUND OF THE INVENTION

The invention relates to an electrode for a glass melting furnace, which comprises a metal electrode shaft to be introduced from outside of and, preferably, above the glass melting furnace into the interior thereof, and of an electrode body of refractory metal such as molybdenum, platinum, tungsten or their alloys, which is joined, e.g., screwed, to the furnace-interior end of the shaft, and is to be mostly immersed in the molten glass in the glass melting furnace, the electrode shaft being of hollow construction and cooled by means of a liquid coolant, and being connectable to an electrical power source.

An electrode of this general kind is disclosed in DE No. 32 07 250 A1. Not only the electrode body but also the electrode shaft consists of refractory molybdenum, platinum or tungsten or their alloys, which results in high material and manufacturing costs and hence high glass furnace operating costs. Moreover, on account of the brittleness of the material used, the shaft has a limited mechanical strength, which has to be compensated by weight-increasing thicknesses. Furthermore, in this known electrode the electrode body is a short cylinder of relatively great diameter. This gives the electrode body good mechanical stability, but as a result the current is fed into the glass melt substantially at a point. This highly localized application of the current results in an irregular energy input and temperature distribution in the glass melt, which is detrimental to the melting process.

Further, elongated plate-like as well as elongated cylindrical electrode bodies are generally known in the glassmaking art. They provide for a regular input of energy to the melt and thus for a better temperature distribution within the melt, but the stability and useful life of these electrode bodies is not always satisfactory; especially when they are used in aggressive melts, great erosion in parts of the electrode body can take place after only a short period of use and consequently the electrode bodies can break off.

It is an object of the invention, therefore to provide an electrode of the kind described above, which will not only be less expensive to make but also have better working qualities.

SUMMARY OF THE INVENTION

This object is accomplished in accordance with the invention by an electrode of the kind specified above, which is characterized by the fact that the electrode shaft is in the form of a coaxial tube with an inner tube made of a metal constituting a good electrical conductor, and an outer tube of a mechanically durable, heat-resistant metal.

The new electrode at the same time offers high mechanical strength and low-loss conduction of current, because for each of these purposes it provides for the use of an especially suitable metal. On the basis of this combination, there is in the new electrode no need for compromises with regard to mechanical strength requirements, on the one hand, and to the quality of electrical conductivity on the other.

Provision is preferably made for the inner tube to be made of copper or copper alloy and the outer tube of steel or steel alloy. These metals have the qualities required, namely good current-carrying capacity in the one case and high mechanical strength on the other, and they are also inexpensive and easy to work.

To assure a mechanically stable and enduring bond and a trouble-free and loss-free transfer of current between the electrode shaft and the electrode body, the inner tube of the electrode shaft is provided, in the area where the electrode shaft and electrode body are joined together, with a female taper and the corresponding end of the electrode body with a male taper.

To protect the transition from the electrode shaft to the electrode body, which mechanically represents the weakest link, against thermal overstress and consequent damage to and weakening of the material, the invention provides for the electrode body to have a bore running from its end facing the electrode shaft into part of the length of the electrode body, and terminating at a distance from the bottom of the bore, to serve as an outlet for coolant. Moreover, the cooling of the junction area creates the possibility of removing, especially of unscrewing, the electrode body from the electrode shaft in an easy and nondestructive manner, even after months of operation in the glass melting furnace. Thus the electrode body and shaft are reliably prevented from sticking together in the junction area, and the attachment of new electrode bodies to the electrode shafts of a glass melting furnace is greatly simplified or for the first time made possible.

To stabilize the electrode and facilitate the mounting of the electrode body on the shaft, a perforated plate is fixedly inserted into the hollow interior of the electrode shaft directly ahead of the junction between the electrode shaft and body; this plate has a central opening which centers the coolant tube, plus a plurality of openings distributed around the central opening for the return of the coolant.

Since it has been found in practice that, in the case of electrodes plunging into the glass melt from above, the greatest electrode wear occurs at about the level of the surface of the molten glass, in the electrode according to the invention the electrode body preferably has a basic, elongated plate-like or elongated cylindrical form, and, in the area of that part of the body which will be situated at the surface level of the molten glass when the electrode is in operation in the furnace it is made thicker. The thickened portion of the electrode body can assume a variety of shapes; preferred configurations of the thickened portion are (1) the thickening is configured as a bulge with continuous thickness or diameter changes, and (2) the thickening is formed with step-like thickness or diameter changes.

Optionally, the electrode body comprises at least two joined electrode body parts of different thicknesses or diameters. This method of construction permits a modular system in which different electrodes can be assembled from relatively few parts at very low manufacturing cost for different applications. Furthermore, worn-out electrode bodies can be reconditioned from time to time, as often as desired, by providing them with a new, preferably thickened, electrode body part. In this case, the worn-out electrode body, i.e., the one that has become thinner and shorter, is removed from the electrode shaft, and the new part is inserted between the latter and the old electrode body, to form a reusable electrode body. The electrode bodies can thus be consumed entirely in the ideal case, i.e., no stubs of the costly electrode body material will remain.

In addition to electrodes plunging into the glass melt from above, electrodes which plunge at an angle and from the side are also common. In these cases the invention provides for the thickening to be asymmetrical and to a greater extent on the underside of the electrode body in order to counteract the electrode body wear which experience has shown to be greatest in that area.

With regard to the size of the thickened parts, provision is made, regardless of the shape involved in the particular case, for the thickness or diameter of the electrode body to be 20 to 100% greater in the area of maximum thickness than the basic thickness or basic diameter of the electrode body.

In accordance with the invention, an electrode for a glass melting furnace, comprises a metal electrode shaft to be introduced from outside of the glass melting furnace into the interior thereof. The electrode also includes an electrode body of refractory metal which is joined to the furnace-interior end of the shaft and is to be mostly immersed in the molten glass in the glass melting furnace. The electrode shaft is of hollow construction and is cooled by means of a liquid coolant. The electrode shaft is connectable to an electrode power source. The electrode shaft is a coaxial tube including an inner tube made of a metal constituting a good electrical conductor, and including an outer tube of a mechanically durable, heat-resistant metal.

For a better understanding of the invention, together with other and further objects thereof, reference is made to the following description, taken in connection with the accompanying drawings, and its scope will be pointed out in the appended claims.

BRIEF DESCRIPTION OF THE DRAWING

Referring now to the drawings.

DESCRIPTION OF PREFERRED EMBODIMENTS

Figure 1:
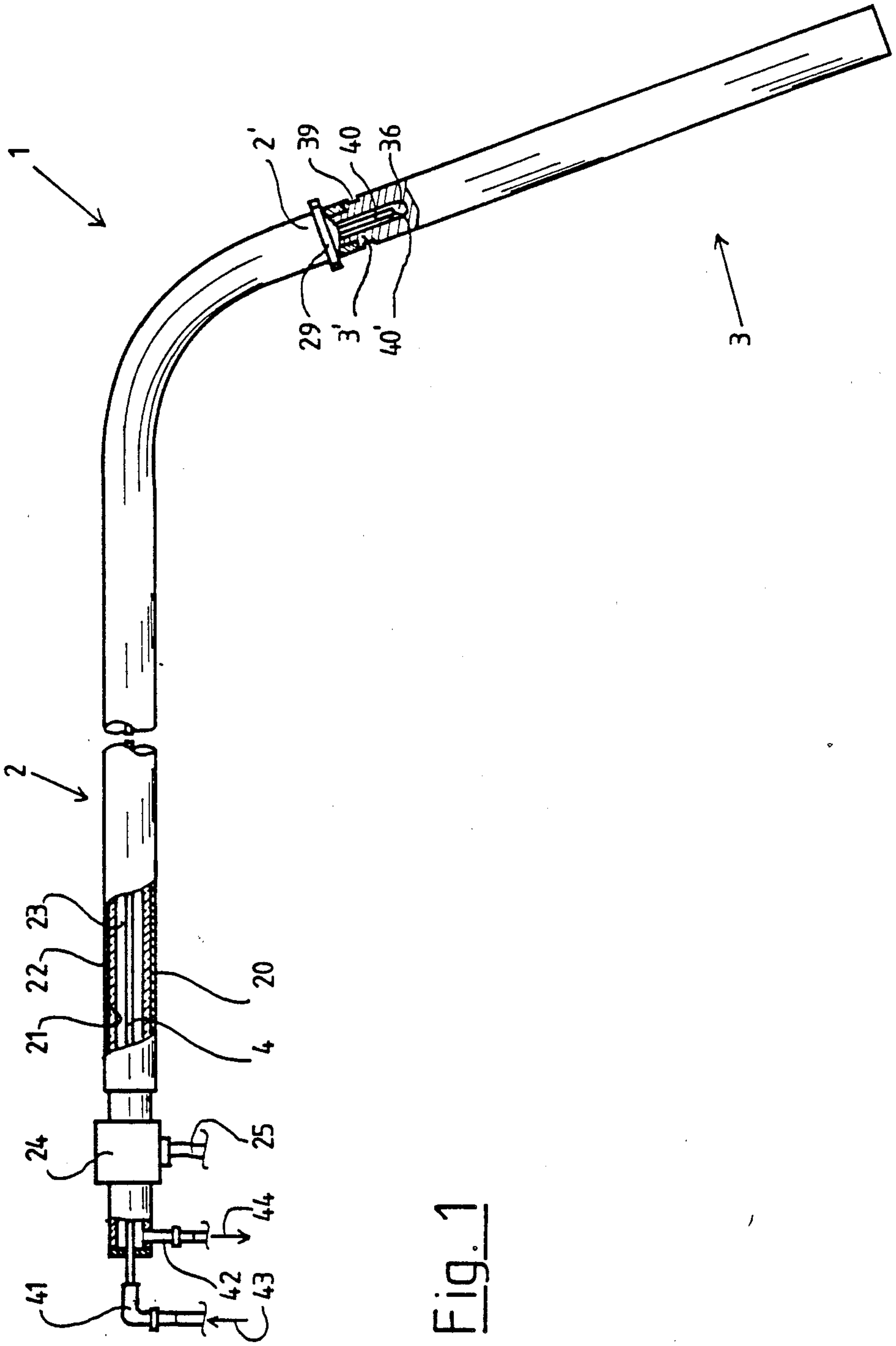
FIG. 1 is a side view, partially in section, of an electrode.

As FIG. 1 of the drawing shows, a first embodiment of the electrode 1 comprises an electrode shaft 2 and an electrode body 3 screwed to the latter. The electrode shaft 2 comprises essentially a coaxial tube 20 which is formed by an inner tube 21 of copper and an outer tube 22 of steel. Over most of its length the electrode shaft 2 is straight, and at its furnace end 2′, on the right in FIG. 1, it is curved downwardly.

At the left end in FIG. 1, i.e., the end of the electrode shaft 2 outside of the furnace, the outer tube 22 is shortened, so that the copper inner tube 21 is accessible from without. In this area a cable 25 supplying electric power is electrically connected to the inner tube 21 by means of a terminal block 24. Due to its good electrical conductivity, the inner tube 21 carries most of the current, while the steel outer tube 22 provides for the mechanical stability of the electrode shaft 2. A small part of the current also passes, of course, through the outer tube, and a small part of the mechanical stress is borne by the inner tube 21.

Through the hollow interior 23 of the coaxial tube 20 runs a coolant line 4 which is brought out of the electrode shaft 2 at the left end of the latter. Coolant—water, for example—, can be fed into the coolant line 4 in the direction of the arrow 43 through an inlet connection 41. The coolant return is carried through the interstice between the outside of the coolant tube 4 and the inside of the inner tube 21 of the coaxial tube 20. At the left end the heated, returning coolant can be discharged through a discharge connection 42 provided o the left end of the electrode shaft, in the radial direction indicated by the arrow 44.

The electrode body 3 of the electrode 1, in the embodiment represented in FIG. 1, is an elongated cylindrical rod of constant outside diameter. It preferably comprises refractory metal, such as molybdenum, platinum, tungsten, or alloys thereof. The upper end of the electrode body 3 adjacent the electrode shaft 2 is a screw end 3′ with an external thread. Accordingly, the end of the electrode shaft 2 has an internal thread to accommodate the screw end 3′ of the electrode body 3. To permit a mechanically strong joint between the electrode shaft 2 and the electrode body 3, the end 2′ of the electrode shaft has a fixedly mounted—e.g., welded-on, hexagonal ring 29 which can be engaged by a wrench. The electrode body 3 is provided close to its screw end 3′ with two wrench flats 39, which likewise permit engagement by a wrench.

It is further apparent from FIG. 1 that the electrode body 3 preferably is provided at its screw end 3′ with a central bore 36 running in the center of the body through a relatively small part of the length of the electrode body 3. Into this bore 36 extends the electrode-body end 40 of the coolant tube 4, which terminates in a coolant outlet 40′ at a distance from the bottom of the bore 36. Thus, the coolant liquid fed through the coolant tube 4 is carried into the upper part of the electrode body 3, and then flows back from there, first through the outer part of the bore 36, and then through the interstice between the coolant tube 4 and the inner tube 21 of the electrode shaft 2.

Figure 2:
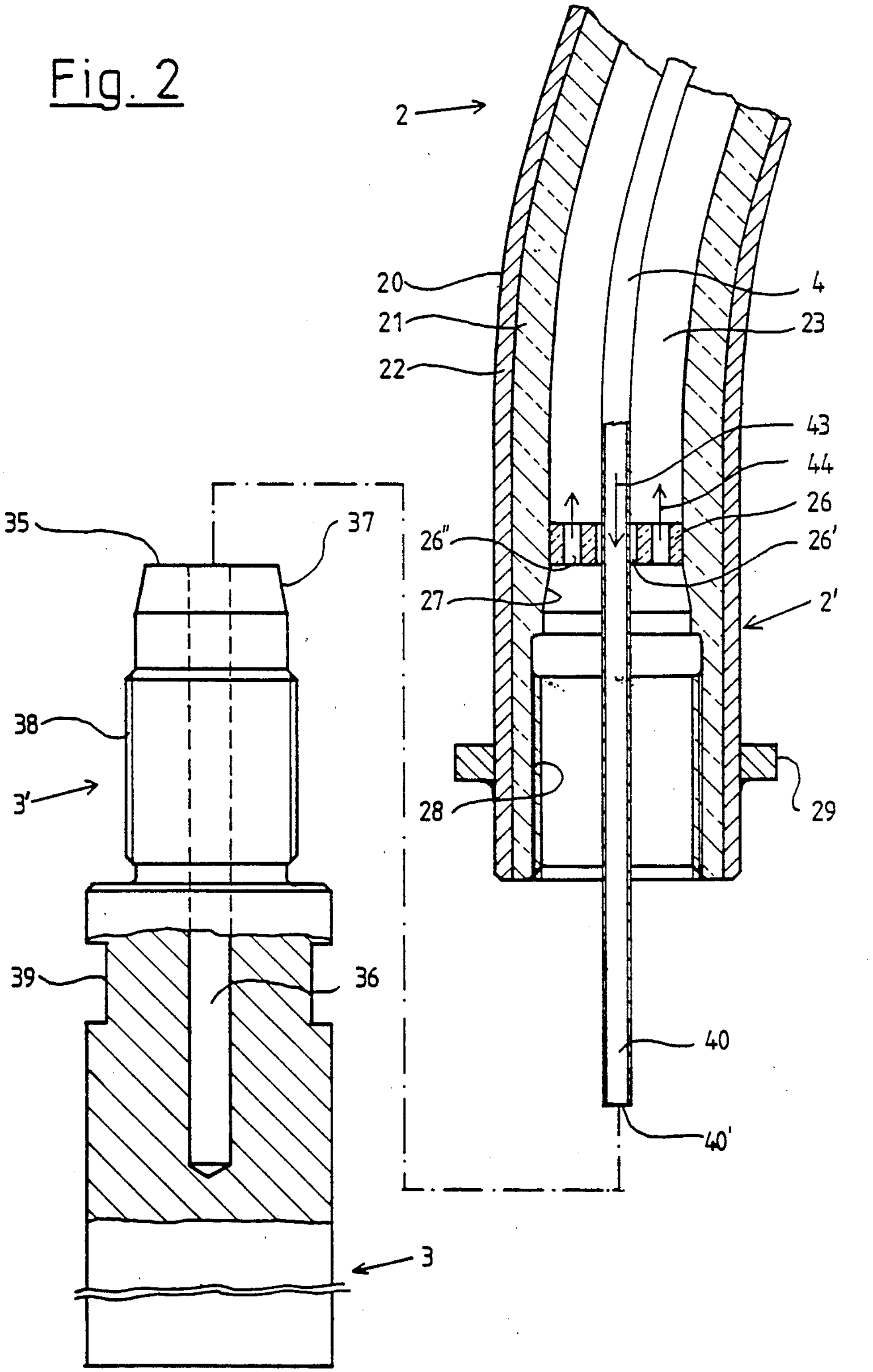
FIG. 2 is an enlarged side view, partially in cross section, of the area of the junction between the electrode shaft and the electrode body.

FIG. 2 of the drawing shows in detail the area of the junction between the electrode shaft 2 and electrode body 3, the two parts 2 and 3 being shown separated from one another for the sake of clarity.

The electrode shaft 2 comprises, as previously explained, the coaxial tube 20 with the copper internal tube 21 and the steel outer tube 22. The coolant tube 4 runs centrally through the hollow interior 23 of the coaxial tube.

On the bottom end 2′, i.e., the end inside the furnace, the hexagonal ring 29 is welded onto the outside of the outer tube 22 and serves for engagement by a wrench in assembling the electrode. The inner tube 21 is provided at the end 2′ of the electrode shaft 2 with the internal thread 28 which serves to accommodate the matching external thread 38 of the electrode body 3. Above the thread 28 the inner tube 21 is provided with a female taper 27 which becomes intimately joined to a male taper 37 on the upper end 3′ of the electrode body 3 when the electrode body 3 is screwed in. The two engaged conical surfaces or tapers 27 and 37 serve on the one hand to assure a low-resistance electrical connection between the electrode shaft 2 and the electrode body 3, and on the other hand for the mechanical securing of the screw connection between shaft 2 and body 3.

Above the taper 27 a perforated plate 26 is fixedly inserted into the inner tube 21 of the coaxial tube 20 and preferably is provided with a plurality of openings 26′ and 26″ which are disposed in the axial direction. The opening 26′ is centrally located in the perforated plate 26 and serves for the centering and guidance of the coolant tube 4. Several additional openings 26" preferably are disposed about the central opening 26' and serve to carry the returning coolant in the direction of the arrow 44. The infeed of the coolant takes place, as already explained, in the direction of the arrow 43, through the interior of the coolant tube 4.

It is especially apparent from FIG. 2 that the coolant tube extends at its lower end, i.e., the electrode-body end 40, slightly beyond the end of the coaxial tube 20. At its outermost end, the coolant tube 4 is open to form a coolant outlet 40'.

The uppermost end of the electrode body 3 is a circular end face 35 from which the central bore 36 extends into the electrode body 3, or more precisely into its screw end 3'. When the electrode shaft 2 and electrode body 3 are screwed together, the end face 35 is at a slight distance from the bottom face of the perforated plate 26, sufficient to allow the coolant to pass through. The end 40 of the coolant tube 4 which has the coolant outlet 40' then will be situated, as already explained, at a distance from the bottom of the bore 36.

Lastly, in the upper part of the electrode body 3, FIG. 2 also shows the two wrench flats 39 cut into its circumference.

Figure 5:
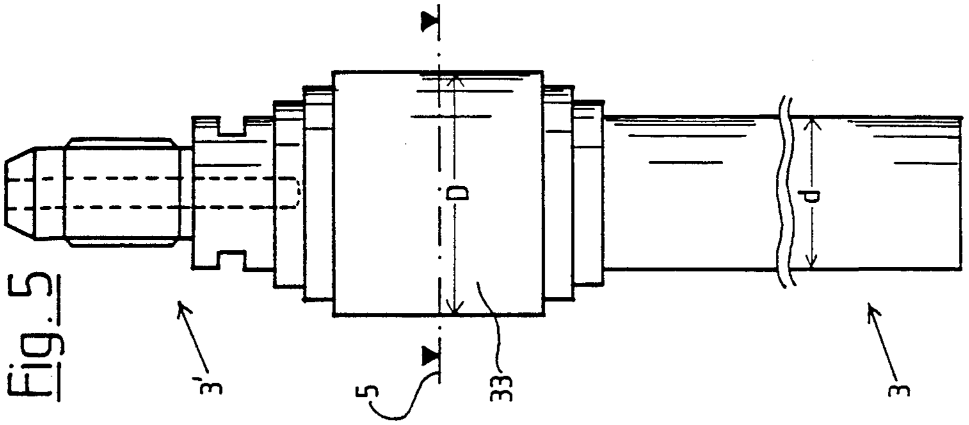
FIGS. 3 to 6 are views of the electrode body in three different embodiments.
Figure 4:
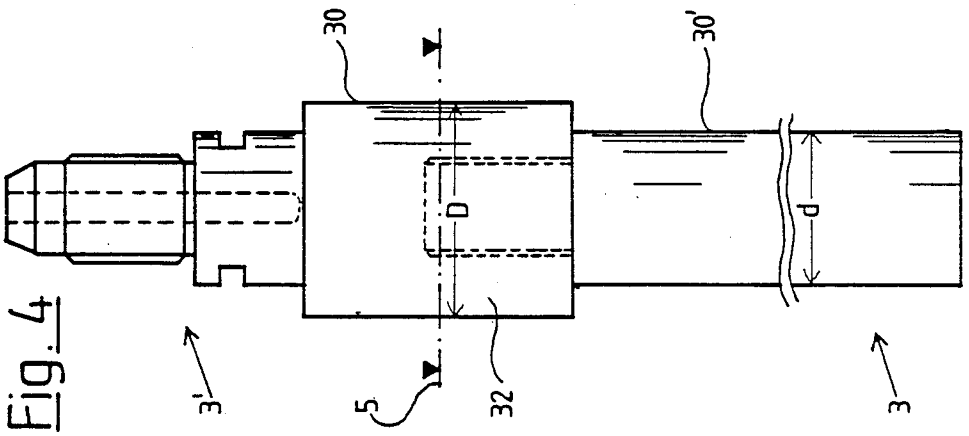
Figure 3:
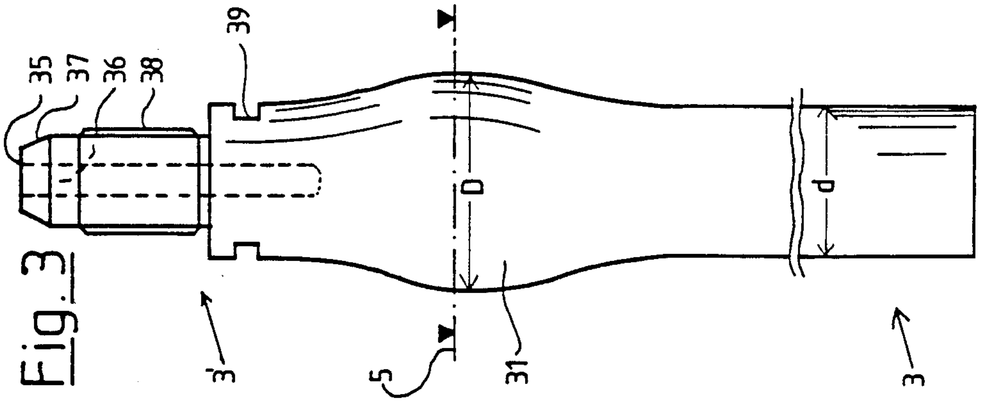

In FIGS. 3, 4 and 5 of the drawing are shown three different electrode bodies as part of the electrode in accordance with the invention. All of the electrode bodies 3 shown here by way of example have it in common that they have a bulge or thickening 31, 32, 33.

In the embodiment of FIG. 3, the electrode body 3 has an elongated cylindrical shape with the basic diameter d. In the upper part of this cylindrical electrode body 3 it is provided with a thickened portion 31 of a bulging shape, i.e., it has a continuously varying diameter. The greatest diameter D of the electrode body 3 at its maximum thickening is substantially at the level of the electrode body 3 at which the surface 5 of the glass melt will be situated when the electrode is in operation. This thickening or bulge 31 allows for the maximum wear that occurs in this part of the electrode body 3.

At the screw end 3' of this electrode body 3 can again be seen the end face 35 with the bore 36 running therefrom, the external taper 37, the external thread 38, and the two wrench flats 39, as described previously.

In the embodiment of the electrode body 3 shown in FIG. 4, the screw end 3' is made the same as in the first example described. Here again, the basic shape of the electrode body 3 is elongated-cylindrical with a basic diameter d. The thickening 32 here has a cylindrical shape, i.e., it is made with a diameter that varies in steps. The diameter of the electrode body 3 accordingly changes in two steps from the smaller diameter d to the greater diameter D, and from the greater diameter D back to the smaller basic diameter d. The line representing the glass melt surface 5 here is located substantially in the middle of the thickened part of the electrode body 3.

Further, in this embodiment of the electrode body 3, the body comprises two parts 30 and 30' which preferably are screwed together. The threaded section is indicated by broken lines in the interior of the upper part 30, representing the thickened portion 32 of the electrode body 3. This configuration of the electrode body 3 permits a modular system to be created, i.e., different electrode bodies 3 can be composed of individual electrode body parts 30 and 30'. Their thickness as well as their lengths can be selected in an optimum manner according to the application and the chemical behavior of the molten glass.

As another embodiment, an electrode body is represented in FIG. 5 whose basic shape is again elongated-cylindrical with a diameter d. The thickening is in this case achieved by varying the diameter of the electrode body 3 in several steps, up to a maximum diameter D. In operation, the surface of the molten glass will, in this electrode body again, be in the middle of the part of the electrode body having the greatest diameter D.

Figure 6:
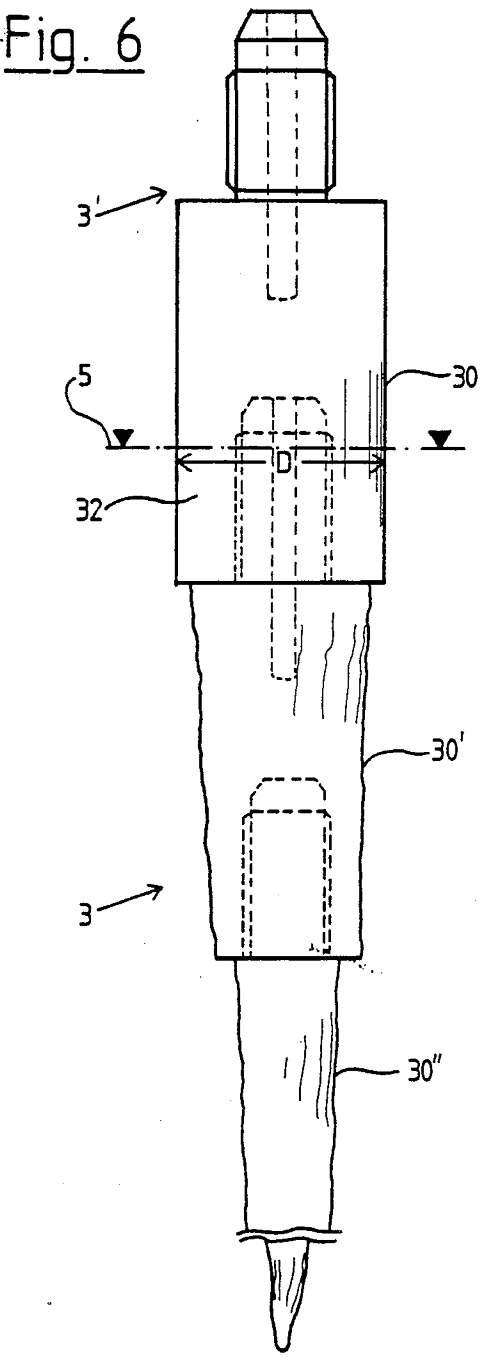

Lastly, FIG. 6 of the drawing shows an electrode body 3 which is screwed together from three electrode body parts 30, 30' and 30". As indicated by the drawing, the two bottom electrode body parts 30' and 30" have already been in use for a long time in a glass melting furnace, so that their diameter and the length of the bottom electrode section 30" have been reduced, and the surface of the two electrode body parts 30' and 30" has become irregular.

The upper electrode body part 30, however, is a new part which has been screwed onto the old electrode body formed by the two bottom electrode body parts 30' and 30" after the latter were removed from the electrode shaft, which here is not seen. The new electrode body part 30 constitutes the thickening 32. The connecting end 3' is here substantially the same as the connecting ends previously described.

By this retrofitting of a new, thickened electrode body part 30, a new electrode body 3 is formed, which can again be used for a long period of time in the glass melting furnace. After the incorporation of the new electrode body part 30, the glass melt level 5 will be at that new body part, i.e., in the area of the maximum thickness D of the newly formed electrode body 3.

The electrode bodies 3 can, of course, also be in the form of plates, in which case they will have a basic thickness d as well as the same kind of thickening to a thickness D.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Electrode for a glass melting furnace, comprising:
a metal electrode shaft to be introduced from outside of the glass melting furnace into the interior thereof; and
an electrode body of refractory metal which is joined to the furnace-interior end of the shaft, and is to be mostly immersed in the molten glass in the glass melting furnace, the electrode shaft being of hollow construction and cooled by means of a liquid coolant, and being connectable to an electrical power source, the electrode shaft being a coaxial tube including an inner tube made of a metal constituting a good electrical conductor, and including an outer tube of a mechanically durable, heat-resistant metal.

2. Electrode in accordance with claim 1, in which the inner tube comprises at least one of the group consisting of copper and copper alloy and the outer tube comprises at least one of the group consisting of steel and alloy steel.

3. Electrode in accordance with claim 1, in which, in the area of the junction of the electrode shaft and the electrode body, the inner tube of the electrode shaft is configured with a female taper and the electrode body has a corresponding end with a corresponding male taper.

4. Electrode in accordance with claim 1, in which the electrode body has an end facing the electrode shaft and has a bore having a bottom and running from its end facing the electrode shaft, into the electrode body through a portion of the length of the latter, and in which the electrode shaft has a hollow interior and which electrode includes a coolant tube running through the hollow interior of the electrode shaft and carried into the bore in the electrode body and, terminating there at a distance from the bottom of the bore and configured as a coolant outlet.

5. Electrode in accordance with claim 3, in which, directly ahead of the junction of the electrode body and electrode shaft, a perforated plate is fixedly disposed in the hollow interior thereof, and the plate having a central opening centering the coolant tube, and the plate having a plurality of through-openings distributed around the central opening for the returning coolant.

6. Electrode in accordance with claim 1, in which the electrode body has an elongated-cylindrical basic shape and, in the area around the body which becomes situated at the level of the molten glass surface when the electrode is in operation in the glass melting furnace, the body has a thickening.

7. Electrode in accordance with claim 6, in which the thickening is configured as a bulge with continuous thickness changes.

8. Electrode in accordance with claim 6, in which the thickening is formed with step-like thickness changes.

9. Electrode in accordance with claim 8, in which the electrode body comprises at least two electrode body parts of different thickness which are joined together.

10. Electrode in accordance with claim 9, in which, in electrode bodies plunging at an angle into the molten glass, the thickening is asymmetrical and is formed to a greater extent on the underside of the electrode body.

11. Electrode in accordance with claim 6, in which the thickness of the electrode body is 20–100% greater in the area of its maximum thickening than the basic thickness of the electrode body.

* * * * *